United States Patent [19]

Ekiner et al.

[11] Patent Number: 5,015,270

[45] Date of Patent: May 14, 1991

[54] PHENYLINDANE-CONTAINING POLYIMIDE GAS SEPARATION MEMBRANES

[75] Inventors: Okan M. Ekiner, Wilmington, Del.; Richard A. Hayes, Parkersburg, W. Va.

[73] Assignee: E. I. Du Pont de Nemours and Company, Wilmington, Del.

[21] Appl. No.: 418,838

[22] Filed: Oct. 10, 1989

[51] Int. Cl.$^5$ .................. B01D 53/22; B01D 71/64
[52] U.S. Cl. ........................... 55/16; 55/68; 55/158; 528/185
[58] Field of Search ............... 55/16, 68, 158; 264/41, 264/298; 528/185, 229

[56] References Cited

U.S. PATENT DOCUMENTS

| Re. 30,351 | 7/1980 | Hoehn et al. | 55/16 |
|---|---|---|---|
| 3,709,774 | 1/1973 | Kimura | 161/159 |
| 3,822,202 | 7/1974 | Hoehn | 55/16 |
| 3,856,752 | 12/1974 | Bateman et al. | 528/229 |
| 3,899,309 | 8/1975 | Hoehn et al. | 29/16 |
| 3,980,456 | 9/1976 | Browall | 55/158 |
| 4,132,824 | 1/1979 | Kimura et al. | 428/220 |
| 4,156,597 | 5/1979 | Browall | 55/16 |
| 4,192,842 | 3/1980 | Kimura et al. | 264/298 |
| 4,279,855 | 7/1981 | Ward | 264/298 |
| 4,378,400 | 3/1983 | Makino et al. | 55/16 X |
| 4,705,540 | 11/1987 | Hayes | 55/16 |
| 4,717,394 | 1/1988 | Hayes | 55/16 |
| 4,734,482 | 3/1988 | Tamai et al. | 528/185 |
| 4,746,474 | 5/1988 | Kohn | 264/41 |
| 4,871,494 | 10/1989 | Kesting et al. | 264/41 |

OTHER PUBLICATIONS

New Characterization Methods for Asymmetric Ultrafiltration Membranes by Smolders & Vugteveen, Materials Science of Synthetic Membranes, D. R. Lloyd, Editor, p. 15, 1985, Amer. Chem. Society.
Evolution of Composite Reverse Osmosis Membranes by Cadotte, Materials Science of Synthetic Membranes, D. R. Lloyd, Editor, p. 12, 1985, Amer. Chem. Society.
Phase-Inversion Membranes by R. Kesting, John Wiley & Sons, 1985, pp. 237 to 286 from Synthetic Polymeric Membranes-A Structural Perspective.
Ultrathin Silicone/Polycarbonate Membranes for Gas Separation Processes by Ward, Browall and Salemme, Journal of Membrane Science, 1 (1976), 99-108.

Primary Examiner—Robert Spitzer
Attorney, Agent, or Firm—Craig H. Evans

[57] ABSTRACT

A permselective polyimide membrane having phenylindane residues incorporated into the polyimide backbone chain exhibiting high selectivity while maintaining good gas permeation rates and a process for using.

14 Claims, No Drawings

PHENYLINDANE-CONTAINING POLYIMIDE GAS SEPARATION MEMBRANES

FIELD OF THE INVENTION

The present invention relates to separation membranes particularly useful for separating gases and their use. The membranes of this invention are made from polyimides compositionally containing phenylindane functions. Membranes formed from this class of polyimides have improved environmental stability and superior gas productivity.

BACKGROUND

Polyimides have long been used as gas separation membranes. Generally, however, this class of polymers exhibits an inverse relationship between the gas permeation rate (flux) and the selectivity of one gas over other gases in a multi-component gas mixture. Because of this, prior art polyimide gas separation membranes tend to exhibit either high flux at the sacrifice of gas selectivities or high gas selectivities at the sacrifice of flux.

For example, U.S. Pat. Nos. 4,705,540 and 4,717,394 teach that certain alkyl-substituted polyimide material membranes have ultrahigh flux but suffer from only moderate gas selectivities.

The polyetherimide gas separation membranes taught in U.S. Pat. No. 4,156,597, exhibit productivities of about 191 centiBarrers when separating oxygen from air and oxygen/nitrogen selectivity of 5.3.

Polyimide gas separation membranes taught in U.S. Pat. No. 4,378,400, have, at an oxygen/nitrogen selectivity of 7.3, a productivity of only 46 centiBarrers.

The polyimide membranes taught in U.S. Re. Pat. No. 30,351, U.S. Pat. Nos. 3,822,202, and 3,899,309 also suffer from moderate gas selectivities.

U.S. Pat. No. 4,746,474 teaches a process for making free-standing, pinhole-free, ultrathin polyimide films, including those incorporating phenylindane residues in a polyimide backbone chain, by casting the polymer on water. The reference alludes to use of the films in gas separation and in end uses where controlled release of drugs is needed.

It would be highly desirable for polyimide gas separation materials to exhibit high gas selectivities while maintaining high fluxes.

SUMMARY OF INVENTION

The present invention relates to the discovery that, by incorporating phenylindane residues in a polyimide backbone chain, gas separation membranes made from the resulting polyimide material exhibit exceptionally high selectivity while maintaining good gas permeation rates.

While not wishing to be limited by this hypothesis, the high gas productivity of these membranes is believed to be due to the optimization of the molecular free volume in the polymer structure resulting from the incorporation of said phenylindane residues in the polyimide chain.

The polyimide membranes disclosed herein have found use in gas separations. The present invention is particularly useful in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

DETAILED DESCRIPTION OF INVENTION

The present invention relates to a membrane made from a polyimide having sufficient phenylindane residues of the following form incorporated into the polyimide backbone chain:

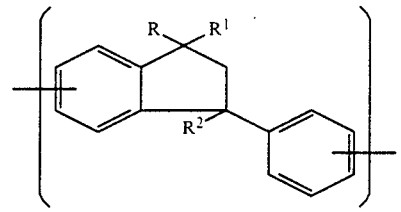

wherein R, $R^1$ and $R^2$ are independently —H or lower alkyls having from 1 to 6 carbon atoms.

The polymer should have sufficient molecular weight to allow it to be formed into a thin film.

The phenylindane may be incorporated within the diamine function, the dianhydride function, or both. Preferably, the diamine is 100 percent in the phenylindane form and the dianhydride can be any dianhydride used in the art.

Examples of preferred diamines which incorporate said phenylindane residues include:

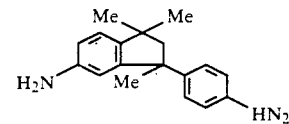

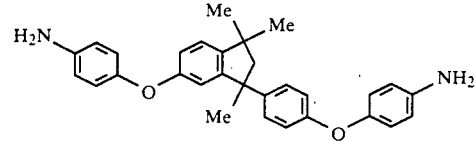

Examples of preferred dianhydrides which incorporate said phenylindane residues include:

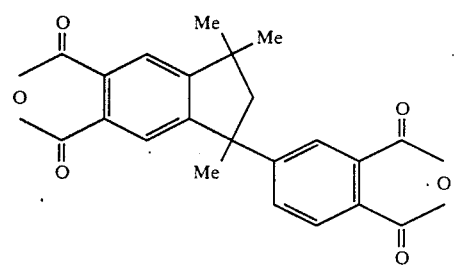

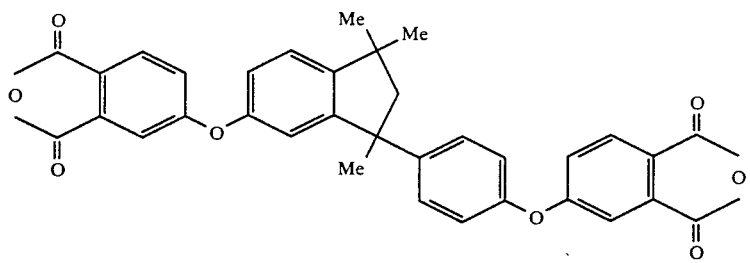

Such phenylindane-containing diamines and dianhydrides have been disclosed in the prior art, see for example, U.S. Pat. Nos. 3,856,752 and 4,734,482. These diamines and dianhydrides containing phenylindane residues are examples only in that any diamine or dianhydride containing phenylindane residues may be included in the present invention.

Polyimide materials useful in the present invention can be prepared by typical prior art methodology such as in U.S. Pat. Nos. 3,856,752 and 4,734,482, which are incorporated herein by reference. Suitable polyimide compositions may be prepared by the polycondensation of the above-described phenylindane-containing diamines and/or dianhydrides either alone or in combination with suitable aromatic diamines, such as:

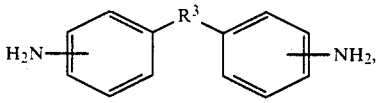

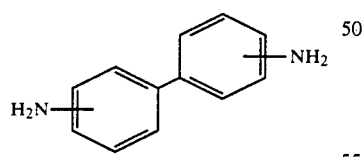

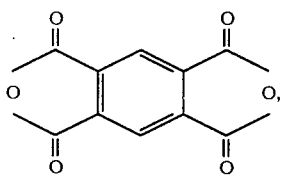

or mixtures thereof, wherein the aromatic nucleus may be substituted with lower alkyl, halogen, or acid residues, and/or with suitable aromatic dianhydrides, such as

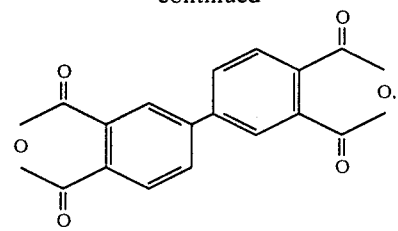

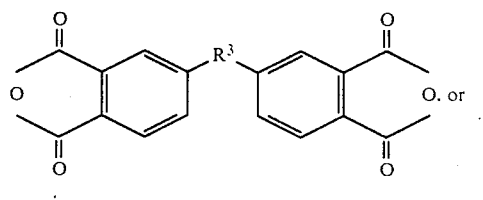

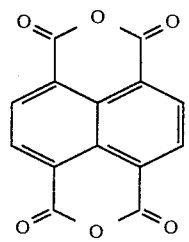

or mixtures thereof, where —R³— is

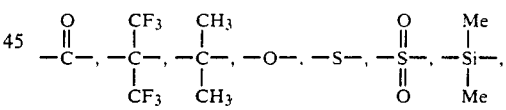

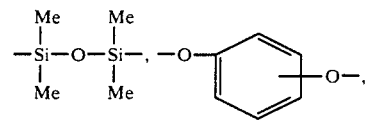

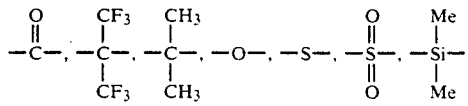—where R⁴ is

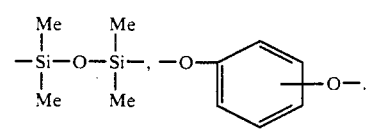

While essentially any polyimide incorporating phenylindane, preferably 50% or more in its repeating unit would be useful in the present invention, the most preferred phenylindane-containing polyimide composition is "MATRIMID 5218" polyimide resin. "MATRIMID 5218" is a commercially-available polyimide resin from the Ciba-Geigy Corporation and is based on the phenylindane diamine; 5(6)-amino-1-(4'-aminophenyl)-1,3-trimethylindane. The polymer repeating unit is believed to consist of:

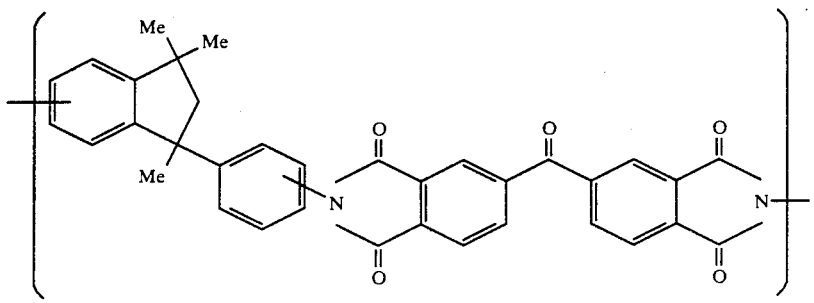

This polyimide composition can be prepared by the methods taught in U.S. Pat. No. 3,856,752.

As a further benefit, the preferred phenylindane-containing polyimide compositions of the present invention are soluble in a wide range of ordinary organic solvents. This is a great advantage for the ease of fabrication of industrially useful gas separation membranes. These soluble polyimides can be solution cast on porous solvent-resistant substrates to serve as the dense separating layer of a composite membrane. Alternatively, they can be solution cast as dense or asymmetric membranes.

The process of this invention for separating one or more gases from a mixture employs gas separation membranes which may be thin dense film membranes or asymmetric membranes having a thin skin on at least one surface thereof. The asymmetric membranes of this invention preferably have a thin skin having a thickness of less than 10,000 Angstroms on one of the surfaces thereof. More preferably, asymmetric membranes have a thin skin having a thickness of less than 2,000 Angstroms on one side of the surfaces thereof.

The process of this invention possess an excellent balance of gas permeation rates and selectivities of one gas over other gases in a multicomponent gas mixture. The phenylindane-containing polyimide materials of the present invention have been found to surprisingly exhibit significantly higher selectivities than taught or suggested in the art while retaining essentially equal or greater permeability.

It is believed that the incorporation of the phenylindane residue into the backbone of the polyimide membrane materials of the invention allows for the optimization of the molecular free volume within membranes of the present invention. This optimization is responsible for the surprisingly high gas selectivity observed for the present materials while maintaining good gas permeation rates.

The polyimides described in this invention have high inherent thermal stabilities. They are generally stable up to 400° C. in air or inert atmospheres (U.S. Pat. No. 3,856,752). The glass transition temperatures of these polyimides are generally above 300° C. (U.S. Pat. No. 3,856,752). The high temperature characteristics of these polyimides can help to prevent the membrane compaction problems observed in other polymers at even moderate temperatures.

EXAMPLES

EXAMPLE 1

A polymer solution containing 15 weight percent (wt. %) "MATRIMID 5218" polyimide in N-methylpyrrolidone was prepared through dissolution. Films of this solution were cast onto a glass plate treated with Du Pont TEFLON ® dry lubricant at 100° C.±2° C. with a 15 mil (38.4×10⁻⁵ meter) knife gap. After drying on the plate at 100° C.±2° C. for 0.5 hours, the films were further dried in a vacuum oven (20 inches mercury) at room temperature overnight. The films were stripped off the plate and dried in a vacuum oven (20 inches mercury) at 120° C. for 4 hours.

Du Pont TEFLON ® dry lubricant contains a fluorocarbon telomer which reduces the adhesion of the membrane to the glass plate.

A 1.56 mils thick film, prepared as above, was tested for mixed gas oxygen/nitrogen (21/79 mole ratio) permeabilities at 478.8 pounds per square inch gauge (psig) and 25.2° C. The results were:

$O_2$ Productivity: 132 centiBarrers
$O_2/N_2$ Selectivity: 7.2

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cm Hg, i.e., $$\text{centiBarrer} = 10^{-12} \times \frac{cm^3 \text{ (STP)} - cm}{cm^2 - sec - cmHg}.$$

A 1.6 mils thick film, prepared as above, was tested for mixed gas oxygen/nitrogen (21/79 mole ratio) permeabilities at 478.0 psig and 25.2° C. The results were:

$O_2$ Productivity: 141 centiBarrers
$O_2/N_2$ Selectivity: 7.1

A 1.6 mils thick film, prepared as above, was tested for mixed gas oxygen/nitrogen (21/79 mole ratio) permeabilities at 489.3 psig and 24.4° C. The results were:

$O_2$ Productivity: 135 centiBarrers
$O_2/N_2$ Selectivity: 7.1

EXAMPLE 2

A 1.63 mils thick film, prepared as in Example 1, was tested for pure gas nitrogen permeability at 305.1 psig and 25.0° C. The $N_2$ Productivity was 20 centiBarrers.

The same film was tested for pure gas helium permeability at 82.8 psig and 25.9° C. The He Productivity was 2250 centiBarrers.

The same film was tested for pure gas carbon dioxide permeability at 263.7 psig and 23.3° C. The result after a 24-hour permeation test was a $CO_2$ Productivity of 702 centiBarrers.

The same film was tested for pure gas carbon dioxide permeability at 274.6 psig and 23.8° C. The results after a 48-hour permeation test was a $CO_2$ Productivity of 717 centiBarrers.

Based on the above gas permeation rates, gas selectivities were calculated to be as follows:

He/$N_5$ Selectivity: 113
$CO_2/N_2$ Selectivity: 35 to 36

EXAMPLE 3

A 1.56 mils thick film, prepared as in Example 1, was tested for pure gas nitrogen permeability at 305.5 psig and 25.0° C. The $N_2$ Productivity was 19 centiBarrers.

The same film was tested for pure gas helium (He) permeability at 83.6 psig and 26.0° C. The He Productivity was 2073 centiBarrers.

The same film was tested for pure gas carbon dioxide permeability at 268.4 psig and 23.4° C. The result after a 24-hour permeation test was a $CO_2$ Productivity of 718 centiBarrers.

The same film was tested for pure gas carbon dioxide permeability at 275.4 psig and 23.7° C. The result after a 48-hour permeation test was a $CO_2$ Productivity of 741 centiBarrers.

Based on the above gas permeation rates, gas selectivities were calculated to be:

He/$N_2$ Selectivity: 109
$CO_2/N_2$ Selectivity: 38 to 39

EXAMPLES 4 AND 5

Asymmetric membranes were prepared from "MATRIMID 5218" polyimide. A 22 wt. % "MATRIMID 5218" polyimide solution in N-methyl-pyrrolidone was cast onto a glass plate with a 15 mil knife gap at 100° C. After drying on the plate for the time noted in Table 1 at 100° C. so as to achieve different thicknesses of dense layers on the surface of the membrane, the films were coagulated in a water bath at 18.0° C. The resulting membranes were washed in water overnight at room temperature, then in methanol for 2 hours at room temperature, and finally in "FREON" 113 for 2 hours at room temperature. The membranes were dried in a vacuum oven (20 inches mercury) at room temperature overnight followed by drying at 100° C. for 4 hours.

Membranes made by the above method were treated to seal defects protruding through the dense gas separating layer of the membranes as taught in U.S. Pat. No. 4,230,463. The membranes were dipped into a 5 wt. % "SYLGARD 184" ( a commercial product of the Dow Corning Corporation) solution in cyclohexane for 5 minutes at room temperature. The membrane was removed from the solution and allowed to drain for 0.5 hour at room temperature. The membrane was dried at 60° C. for one hour and then further dried in a vacuum oven (20 inches mercury) at 60° C. overnight.

Both the treated and untreated membranes were tested for pure gas nitrogen and helium permeabilities at 100 psig and 25° C. The results are reported in Table 1.

TABLE 1

| Example | Dry Time (min) | Untreated PHe(GPU) | Untreated PHe/PN$_2$ | Treated PHe(GPU) | Treated PHe/PN$_2$ |
| --- | --- | --- | --- | --- | --- |
| 4 | 0.5 | 530 | 7.1 | 170 | 61 |
| 5 | 1.0 | 555 | 5.4 | 245 | 71 |

A Gas Permeation Unit (GPU) is the cubic centimeters of gas passed by the membrane at standard temperature and pressure times $10^{-6}$ divided by the area of the membrane in square centimeters times the time in seconds times the pressure on the side of the membrane in cm Hg, i.e., $$GPU = 10^{-6} \frac{cm^3 \ (STP)}{cm^2 - sec(cmHg)}$$

EXAMPLE 6

The treated membrane of Example 5 was tested for mixed gas oxygen/nitrogen (21/79 mole ratio) permeabilities at 100 psig and 23° C. The results were:

$O_2$ productivity: 18 GPU
$O_2/N_2$ Selectivity: 5.2

EXAMPLE 7

This example describes the preparation and processes therein of asymmetric hollow fiber membranes from "Matrimid 5218" polyimide. The hollow fiber membranes are spun from a hollow fiber spinnerette into a water coagulant as has been taught in the prior art. For example, they may be of the type described in U.S. Pat. No. 4,230,463 or of Cabasso et al. in Research and Development of NS-1 and Related Polysulfone Hollow Fibers for Reverse Osmosis Desalination of Seawater (NTIS PB-248666, 7/1975).

A polymer solution was prepared with 27 wt. % solids content of "Matrimid 5218" and 20 wt. % (based on polymer) of "Thermogard-230", available commercially from M&T Chemicals Co., in N-methyl pyrrolidone.

The above polymer solution was extruded through a hollow fiber spinnerette with fiber channel dimensions of outer diameter (OD) equal to 21 mils (533 microns) and inner diameter (ID) equal to 10 mils (254 microns) at the rate of 130 cc per hour at 100° C. A solution of 85 volume % N-methylpyrrolidone in water was injected into the fiber bore at a rate of 60 cc per hour. The spun fiber passed through an air gap of 10.0 cm at room temperature into a water coagulant bath maintained at 22° C. The fiber was wound up on a drum at the rate of 100 meters per minute.

The water-wet fiber was dehydrated as taught in U.S. Pat. Nos. 4,080,743; 4,080,744; 4,120,098; and EPO 219,878. This specifically involved the sequential replacement of water with methanol, the replacement of methanol with "Freon 113" (1,1,2-trichloro-1,2,2-trifluoroethane), and air-drying. The dry fibers were cut into lengths of approximately 20 inches (0.51 m) long and the open ends of the fibers were potted in an epoxy resin within a ¼-inch (0.00635 m) diameter stainless steel tube to provide loops approximately 9 inches (0.23 m) long. From 10 to 24 fibers were so potted for the individual tests.

An asymmetric hollow fiber, prepared as described above, was tested for mixed gas oxygen/nitrogen permeabilities at 100 psig (689 KPa), room temperature. Results are reported below:

O₂ Productivity: 25 GPU
O₂/N₂ Selectivity: 6.2

The outer surfaces of the membrane were contacted with hexane at room temperature for 0.25 hour at a vacuum of 20 inches mercury in the fiber bore. The hexane was drained and the membrane allowed to air-dry.

The asymmetric membrane treated as above was tested for mixed gas oxygen/nitrogen permeabilities at 100 psig (689 KPa), room temperature. Results are reported below:

O₂ Productivity: 10 GPU
O₂/N₂ Selectivity: 6.8

I claim:

1. A process of separating a component from a mixture of gases having high sensitivity and gas permeation rates comprising bringing the mixture into contact with a feed side of a permselective composite or asymmetric membrane in a manner to cause a portion of the mixture to pass through the membrane to a permeate side, the resulting gas mixture on the permeate side being enriched in the component over that of the mixture on the feed side; the membrane being formed from a polyimide polymer having incorporated into the repeating polymer unit a phenylindane residue of the form;

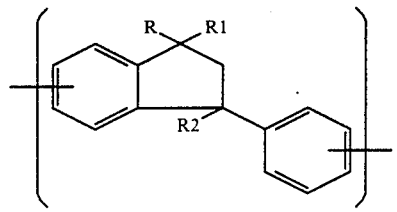

wherein R, R1 and R2 are independently —H or lower alkyl having from 1 to 6 carbon atoms.

2. The process of claim 1 wherein the phenylindane is at least 50% of the repeating polymer unit.

3. The process of claim 2 wherein the polyimide repeating unit comprises a diamine function which is 100% of the phenylindane.

4. The process of claim 3 wherein the phenylindane-containing polyimide is

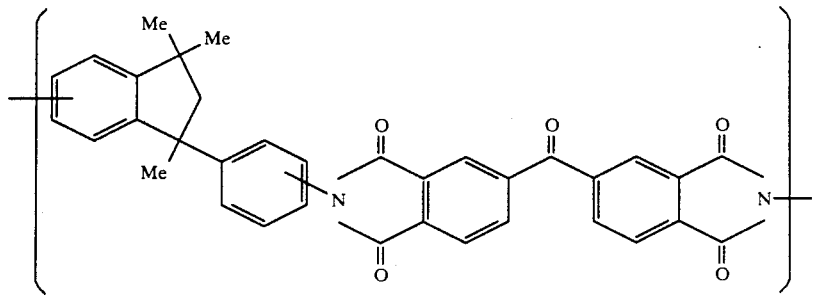

5. The process of claim 1 wherein the membrane is asymmetric.

6. The process of claim 1 wherein the membrane is a hollow fiber.

7. The process of claim 6 wherein the gas mixture brought into contact with the feed side of the membrane comprises air and the resulting gas mixture on the permeate side is enriched in oxygen.

8. The process of claim 5 wherein the gas mixture brought into contact with the feed side of the membrane comprises air and the resulting gas mixture on the permeate side is enriched in oxygen.

9. The process of claim 1 wherein the gas mixture brought into contact with the feed side of the membrane comprises air and the resulting gas mixture on the permeate side is enriched in oxygen.

10. An asymmetric membrane formed of a polyimide polymer having incorporated into the repeating polymer unit a phenylindane residue of the form:

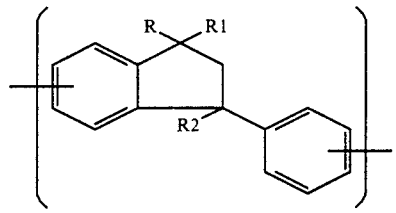

wherein R, R¹ and R² are independently —H or lower alkyl having from 1 to 6 carbon atoms.

11. The membrane of claim 10 wherein the phenylindane is at least 50% of the repeating polymer unit.

12. The membrane of claim 11 wherein the polyimide repeating unit comprises a diamine function which is 100% of the phenylindane.

13. The membrane of claim 12 wherein the phenylindane-containing polyimide is

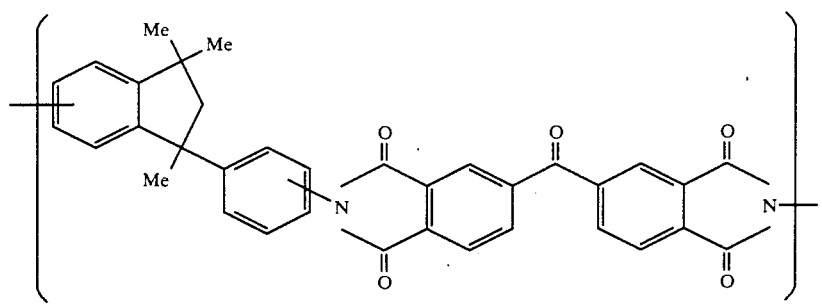
14. The membrane of claim 10 wherein the membrane is an asymmetric hollow fiber membrane.
* * * * *